129,310

UNITED STATES PATENT OFFICE.

PHILIP BEARSCH, OF BALTIMORE, MARYLAND.

IMPROVEMENT IN HAIR-RESTORATIVES.

Specification forming part of Letters Patent No. 129,310, dated July 16, 1872.

Specification of an Improved Hair-Restorative, invented by PHILIP BEARSCH, of the city of Baltimore in the State of Maryland.

*Nature and Objects of the Invention.*

My invention consists of the compound hereinafter described, which, when made in accordance with the directions given, constitutes a highly-effective as well as a harmless and agreeable liquid preparation for the restoration and preservation of the hair.

The compound is made according to the following formula: Take one-half peck white onions and ten ounces burdock-root. Roast and cut the onions, and then boil them together with the burdock-root in one (1) gallon of white rum for about one (1) hour. Filter when cold. Take one (1) gallon soft water and one (1) pint pine-tar; boil for about fifteen minutes, and when cold add to the filtered extract of onions and burdock-root. Take one (1) gallon alcohol; two (2) ounces oil cajeput; one (1) ounce oil rosemary; two (2) ounces oil bergamot; one (1) ounce spirits ammonia; six (6) drams tincture opium; six (6) drams tincture castoreum. Mix these and add to the previous mixture. Then add two (2) gallons white rum and one (1) pound glycerine. Mix all together.

I am aware that an extract of onions has before been used as a hair-restorative. This, therefore, I do not claim. The addition of burdock-root adds much to the efficacy of the preparation, and the tar-water, beside being valuable in its effect on the scalp, imparts a fresh and pleasant odor, and disguises that of the onions.

*Claim.*

I claim as my invention—

The hair-restorative herein described, consisting of the ingredients specified, compounded in the manner and in about the proportions stated.

PHILIP BEARSCH.

Witnesses:
OCTAVIUS KNIGHT,
WALTER ALLEN.